United States Patent
Roh et al.

(10) Patent No.: US 8,514,745 B2
(45) Date of Patent: Aug. 20, 2013

(54) METHOD OF INDICATING NUMBER OF ANTENNAS IN NETWORK BROADCAST SYSTEM

(75) Inventors: Dongwook Roh, San Diego, CA (US); Bonghoe Kim, Anyang-si (KR); Daewon Lee, Anyang-si (KR); Yujin Noh, Anyang-si (KR); Byeongwoo Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 507 days.

(21) Appl. No.: 12/788,750

(22) Filed: May 27, 2010

(65) Prior Publication Data

US 2010/0302978 A1   Dec. 2, 2010

Related U.S. Application Data

(60) Provisional application No. 61/181,640, filed on May 27, 2009.

(51) Int. Cl.
*H04L 45/02* (2006.01)
*H04L 72/005* (2006.01)

(52) U.S. Cl.
USPC ............ 370/255; 370/312; 370/334; 370/339

(58) Field of Classification Search
None
See application file for complete search history.

(56) References Cited

U.S. PATENT DOCUMENTS

| | | | |
|---|---|---|---|
| 2005/0190728 A1 | 9/2005 | Han et al. | |
| 2009/0060088 A1* | 3/2009 | Callard et al. | 375/299 |
| 2009/0176463 A1* | 7/2009 | Raaf et al. | 455/101 |
| 2009/0276684 A1* | 11/2009 | Stewart et al. | 714/758 |
| 2010/0227569 A1* | 9/2010 | Bala et al. | 455/73 |
| 2010/0323637 A1* | 12/2010 | Roman et al. | 455/101 |
| 2011/0293037 A1* | 12/2011 | Liu et al. | 375/295 |

FOREIGN PATENT DOCUMENTS

| WO | 2008032979 | 3/2008 |
|---|---|---|
| WO | 2008136574 | 11/2008 |

* cited by examiner

*Primary Examiner* — Yemane Mesfin
*Assistant Examiner* — Christine Duong
(74) *Attorney, Agent, or Firm* — Lee, Hong, Degerman, Kang & Waimey

(57) ABSTRACT

A method for generating a broadcast signal includes forming an information block for transmission, the information block including a first field comprising a plurality of bits configured to impart information to a first group of user equipment (UEs) regarding a first evolved NodeB (eNodeB) transmit antenna configuration. The method further includes generating error detection bits based upon the information block and scrambling the error detection bits using a mask according to a second eNodeB transmit antenna configuration, such that the mask is configured to impart information to a second group of UEs regarding the second eNodeB transmit antenna configuration. The method also includes generating the broadcast signal having the information block and the scrambled error detection bits, and transmitting the generated broadcast signal via a packet broadcast control channel.

14 Claims, 16 Drawing Sheets

FIG. 10

MasterInformationBlock characteristics

Signalling radio bearer : N/A
   RLC-SAP : TM
   Logical channel : BCCH
   Direction : E-UTRAN to UE MasterInformationBlock fields

```
-- ASN1START
MAsterInformationBlock :: =      SEQUENCE {
    dl-Bandwidth                 ENUMERATED {
                                     n6, n15, n25, n50, n75, n100},
    phich-config                 PHICH-Config,
    systemFrameNumber            BIT STRING (SIZE (8)),
    spare                        BIT STRING (SIZE (10))
}
--ASN1STOP
```

FIG. 11

New MasterInformationBlock fields

```
-- ASN1START
MasterInformationBlock ::=        SEQUENCE {
    dl-Bandwidth                  ENUMERATED {
                                  n6, n15, n25, n50, n75, n100},
    phich-Config                  PHICH-Config,
    systemFrameNumber             BIT STRING (SIZE (8)),
    number of antennas in LTEA    BIT STRING (SIZE (2)),
    spare                         BIT STRING (SIZE (8))
}
-- ASN1STOP
```

METHOD OF INDICATING NUMBER OF ANTENNAS IN NETWORK BROADCAST SYSTEM

CROSS-REFERENCE TO RELATED APPLICATIONS

Pursuant to 35 U.S.C. §119(e), this application claims benefit of priority from provisional application Ser. No. 61/181,640, filed on May 27, 2009, the contents of which are incorporated by reference herein in their entirety.

FIELD OF THE INVENTION

Embodiments of the present invention relate to wireless communications, and in particular to generating antenna diversity scheme information.

DESCRIPTION OF THE RELATED ART

The universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS is under development by the 3rd generation partnership project (3GPP), which standardized UMTS.

In an LTE communication system, a base station may utilize one of several antenna diversity schemes in transmitting data to a mobile terminal (or user equipment (UE)). These antenna diversity schemes correspond to the number of transmit antennas (or transmit antenna ports) used by the base station in transmitting the data to the mobile terminal.

According to the LTE specification (see, e.g., the 3GPP TS36 series, Release 8, which is referred to herein as "LTE Release 8"), up to 4 transmit antennas are supported at the base station. With regards to the 4 transmit antennas, 3 antenna diversity schemes are supported: one scheme corresponding to 1 transmit antenna; one scheme corresponding to 2 transmit antennas; and one scheme corresponding to 4 transmit antennas. Information effectively identifying the utilized antenna diversity scheme is provided to the mobile terminal, so that the mobile terminal can correctly decode the data that it receives from the base station.

SUMMARY OF THE DISCLOSURE

In accordance with an embodiment, a method for generating a broadcast signal includes forming an information block for transmission, the information block comprising a first field comprising a plurality of bits configured to impart information to a first group of user equipment (UEs) regarding a first evolved NodeB (eNodeB) transmit antenna configuration; generating error detection bits based upon the information block; scrambling the error detection bits using a mask according to a second eNodeB transmit antenna configuration, wherein the mask is configured to impart information to a second group of UEs regarding the second eNodeB transmit antenna configuration; generating the broadcast signal comprising the information block and the scrambled error detection bits; and transmitting the generated broadcast signal via a packet broadcast control channel.

In accordance with another embodiment, a wireless broadcast system includes a transmitter configured to transmit a generated broadcast signal via a packet broadcast control channel; a processor configured to: form an information block for transmission, the information block comprising a first field comprising a plurality of bits configured to impart information to a first group of user equipment (UEs) regarding a first evolved NodeB (eNodeB) transmit antenna configuration; generate error detection bits based upon the information block; scramble the error detection bits using a mask according to a second eNodeB transmit antenna configuration, wherein the mask is configured to impart information to a second group of UEs regarding the second eNodeB transmit antenna configuration; generate the broadcast signal comprising the information block and the scrambled error detection bits; and cause the transmitter to transmit the generated broadcast signal via the packet broadcast channel.

In accordance with yet another an embodiment, a method of transmitting broadcast channel information includes providing a first reference signal in one of (a) a plurality of first resource elements reserved for a first antenna port or (b) a plurality of second resource elements reserved for a second antenna port, such that the other of (a) the plurality of first resource elements or (b) the plurality of second resource elements are left unused; providing a second reference signal in a plurality of third resource elements reserved for a third antenna port and in a plurality of fourth resource elements reserved for a fourth antenna port, for indicating a number of employed antennas ranging from a minimum of 1 to a maximum of 4; and transmitting the provided first reference signal and the provided second reference signal.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

FIG. 10 shows a structure of a Master Information Block.

FIG. 11 shows another structure of a Master Information Block.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be presented herein in the context of a wireless communication network and associated entities configured in accordance with the long term evolution (LTE) Advanced system. However, alternatives to such implementations are envisioned, and teachings with regard to LTE Advanced are generally applicable to other standards and air interfaces as well. Moreover, the use of certain terms to describe various embodiments should not limit such embodiments to a certain type of wireless communication system, such as LTE Advanced. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), and universal mobile telecommunications system (UMTS), and the global system for mobile communications (GSM). By way of non-limiting example only, further description will relate to an LTE Advanced communication system, but such teachings apply equally to other system types.

As previously described, the LTE specification is captured, for example, in the 3GPP TS36 series, release 8. In some embodiments, a maximum of 4 transmit antennas is supported at the base station and may function according to the LTE specification. In an LTEA system as presented herein, a maximum of 8 or greater transmit antennas is supported at the base station. As such, a correspondingly larger number of antenna diversity schemes (i.e., 4 schemes versus 3 schemes) is supported: one scheme corresponding to 1 transmit antenna; one scheme corresponding to 2 transmit antennas; one scheme corresponding to 4 transmit antennas; and one scheme corresponding to 8 transmit antennas.

Figure 1:
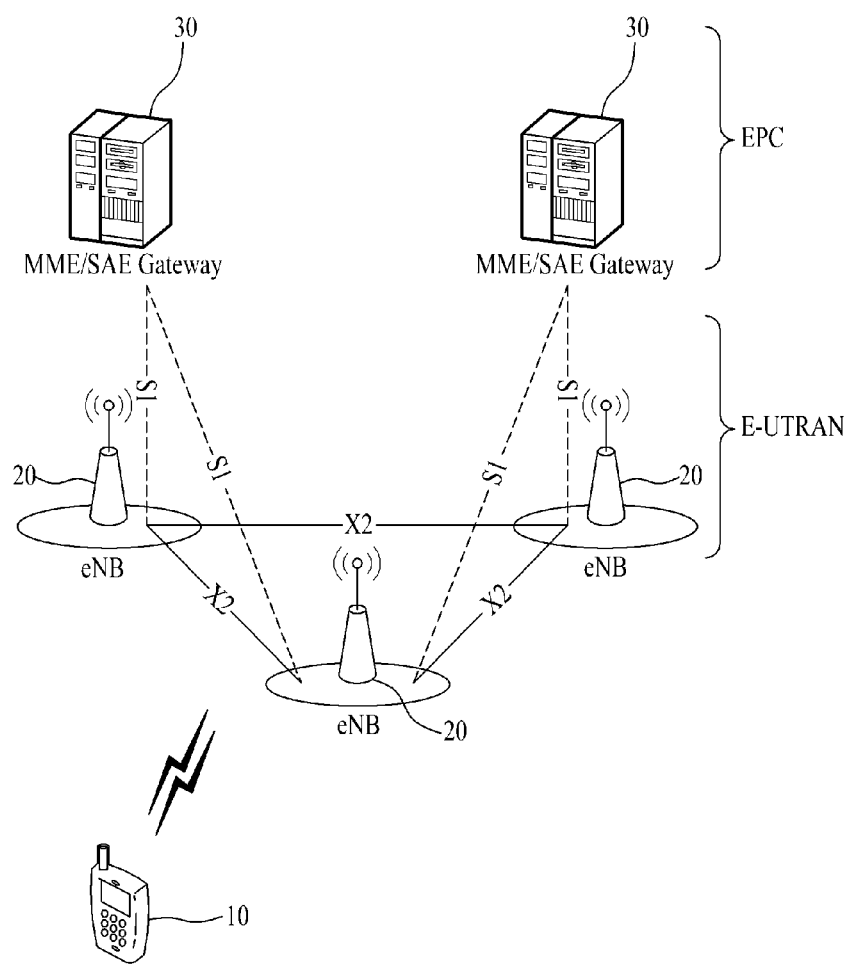
FIG. 1 is a block diagram of an LTE system in accordance with various embodiments of the present invention.

FIG. 1 is a diagram illustrating a network structure of an evolved universal mobile telecommunication system (E-UMTS). The E-UMTS may be also referred to as an LTE system. The system may be widely deployed to provide a variety of communication services such as voice and packet data, and is generally configured to function based upon the various techniques presented herein and discussed in more detail with regard to later figures.

With reference to FIG. 1, the E-UMTS network includes an evolved UMTS terrestrial radio access network (E-UTRA/V), an Evolved Packet Core (EPC), and one or more mobile terminals (or user equipment (UE)) 10. The E-UTRA/V includes one or more base stations 20. Regarding the EPC, MME/SAE gateway 30 provides an end point of a session and mobility management function for the UE 10. The eNodeB 20 and the MME/SAE gateway 30 may be connected via an S1 interface.

The UE 10 is a communication device carried by a user and may also be referred to as a mobile station (MS), a user terminal (UT), a subscriber station (SS) or a wireless device.

The eNodeB 20 is generally a fixed station that communicates with the UE 10. In addition to being referred to as a base station, the eNodeB 20 may also be referred to as an access point. An eNodeB 20 provides end points of a user plane and a control plane to the UE 10. In general, the eNodeB includes a transmitter and processor, among other components, and is configured to operate in accordance with the various techniques presented herein.

A plurality of UEs 10 may be located in one cell. One eNodeB 20 is typically deployed per cell. An interface for transmitting user traffic or control traffic may be used between eNodeBs 20. As used herein, "downlink" refers to communication from the eNodeB 20 to the UE 10, and "uplink" refers to communication from the UE to the eNodeB.

The MME gateway 30 provides various functions including distribution of paging messages to eNodeBs 20, security control, idle state mobility control, SAE bearer control, and ciphering and integrity protection of non-access stratum (NAS) signaling. The SAE gateway 30 provides assorted functions including termination of U-plane packets for paging reasons, and switching of the U-plane to support UE mobility. For ease of description, the MME/SAE gateway 30 may be referred to herein as simply a "gateway". However, it is understood that such a structure may also include both an MME gateway and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2A:
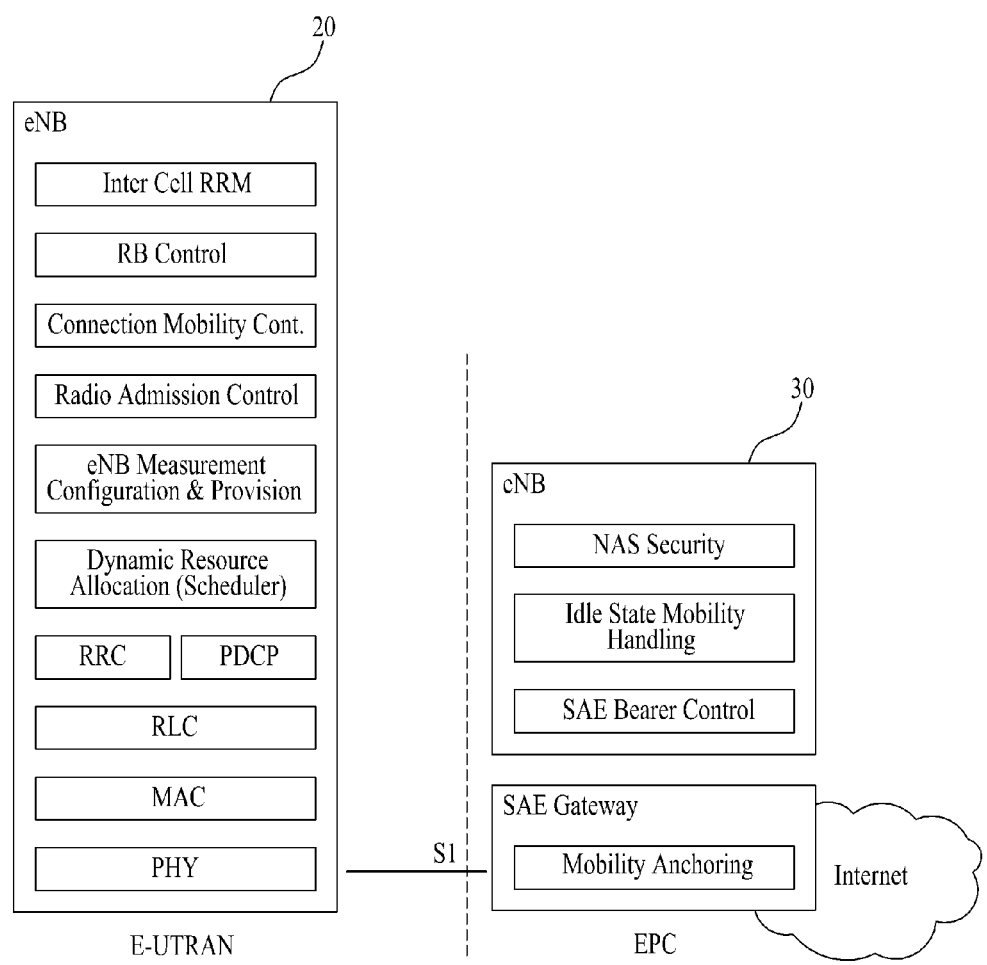
FIG. 2A is block diagram of a logic architecture of an LTE system in accordance with various embodiments of the present invention.

FIG. 2(a) is a block diagram depicting a general structure of a typical E-UTRA/V and that of a typical EPC. With reference to FIG. 2(a), eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state.

In the EPC, and as described above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

Figure 2B:
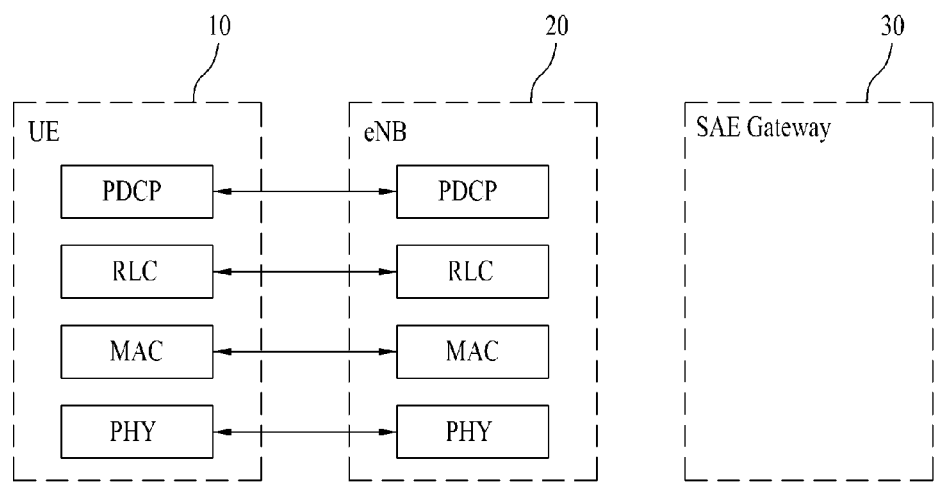
FIG. 2B is a block diagram of a user-plane (U-plane) protocol stack in an LTE system in accordance with various embodiments of the present invention.
Figure 2C:
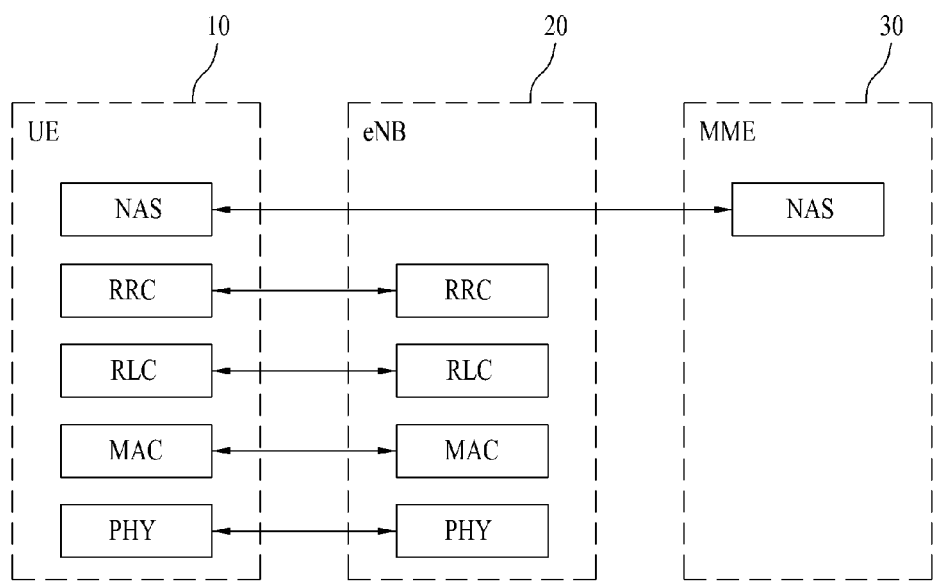
FIG. 2C is a block diagram of a control-plane (C-plane) protocol stack in an LTE system in accordance with various embodiments of the present invention.

FIGS. 2(b) and 2(c) are block diagrams depicting the user-plane protocol and the control-plane protocol stack for the E-UMTS network. With reference to FIGS. 2(b) and 2(c), the protocol layers may be divided into a first layer (L1), a second layer (L2) and a third layer (L3) based upon the three lower layers of an open system interconnection (OSI) standard model as known in the art of communication systems.

The first layer L1 (or the physical layer) provides an information transmission service to an upper layer using a physical channel. The physical layer is connected with a medium access control (MAC) layer located at a higher level through a transport channel, and data between the MAC layer and the physical layer are transferred via the transport channel. Between different physical layers, namely, between physical layers of a transmission side and a reception side (for example, between physical layers of UE 10 and eNodeB 20), data are transferred via the physical channel 21.

The MAC layer of Layer 2 (L2) provides services to a radio link control (RLC) layer (which is a higher layer) via a logical channel. The RLC layer of Layer 2 (L2) supports a reliable transmission of data. Although the RLC layer is shown in FIGS. 2(*b*) and 2(*c*) as being separate from the MAC layer, it is understood that the functions of the RLC layer may be performed by the MAC layer and that, therefore, a separate RLC layer is not required. With reference to FIG. 2(*b*), the packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

With reference to FIG. 2(*c*), a radio resource control (RRC) layer located at the lowest portion of the third layer (L3) is typically only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRA/V.

With reference to FIG. 2(*b*), the RLC and MAC layers (terminated in an eNodeB 20 on the network side) may perform functions such as Scheduling, Automatic Repeat Request (ARQ), and hybrid automatic repeat request (HARQ). The PDCP layer (terminated in eNodeB 20 on the network side) may perform the user plane functions such as header compression, integrity protection, and ciphering.

With reference to FIG. 2(*c*), the RLC and MAC layers (terminated in an eNodeB 20 on the network side) perform the same or similar functions as for the control plane. The RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Also, the RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in the RRC-IDLE state, no RRC context is stored in the eNodeB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRA/V RRC connection and a context in the E-UTRA/V, such that transmitting and/or receiving data to/from the network (eNodeB) becomes possible. Also, the UE 10 can report channel quality information and feedback information to the eNodeB.

In RRC_CONNECTED state, the E-UTRA/V knows the cell to which the UE 10 belongs. Therefore, the network can transmit and/or receive data to/from UE 10, the network can control mobility (handover) of the UE, and the network can perform cell measurements for a neighboring cell.

Aspects of communications from a base station (e.g., an eNodeB 20 of an LTEA system) to a mobile station (e.g., the UE 10 of an LTEA system) will now be described in more detail. First, the cyclic redundancy check (CRC) is described.

A CRC is generally implemented as an error-detecting code. The computation of the CRC resembles a long division operation in which the quotient is discarded and the remainder becomes the result, with the understood distinction that the arithmetic used is usually the carry-less arithmetic of a finite field. The length of the remainder is generally less than or equal to the length of the divisor, which therefore determines how long the result can be. The definition of a particular CRC specifies the divisor to be used, among other things.

Although CRCs can be constructed using any finite field, commonly used CRCs employ the finite field GF(2). This is the field of two elements, usually called 0 and 1, comfortably matching computer architecture. For purposes of description, this disclosure will address only binary CRCs. However, it is understood that CRCs defined over larger finite fields having more than two elements may be employed.

One reason for the popularity of CRCs for detecting the accidental alteration of data is their efficiency guarantee. Typically, an n-bit CRC, applied to a data block of arbitrary length, will detect a single error burst not longer than n bits (in other words, any single alteration that spans no more than n bits of the data). Errors in data transmission channels (as well as in magnetic storage media) tend to be distributed non-randomly (i.e., the errors are "bursty"), making CRCs more useful than alternative schemes such as multiple parity checks. The simplest error-detection system, the parity bit, is a CRC: it uses the two-bit-long divisor 11.

An example of a calculation of a CRC will now be described. Hereinafter, for purposes of description, all bit sequences are assumed to be represented in the form of a polynomial unless otherwise specified.

Assume that a CRC with length of L bits is applied to a message block with length of k bits. The CRC of L bits can be calculated based on a generation polynomial g(x) whose order is equal to L. The polynomial representation of the message block of k bits is denoted by m(x) which has an order equal to k−1. The actual transmission will typically have the form of appending the CRC to the end of the message part, which results in a total number of n(=k+L) transmitted bits.

The addition of a CRC to m(x) is described in more detail below.

First of all, the information polynomial m(x) is to be shifted left by the order of CRC generation polynomial g(x) (i.e., L), and be expressed by a(x). In other words, with reference to Eq. 1, a(x) may be represented simply as a multiplication of m(x) and $X^L$.

$$a(x)=m(x)x^L \qquad (\text{Eq. 1})$$

The a(x) can be divided by CRC generation polynomial g(x) of order L such that, with reference to Eq. 2, the quotient and the remainder are represented by q(x) and p(x), respectively.

$$a(x)=m(x)x^L=q(x)g(x)+p(x) \qquad (\text{Eq. 2})$$

In order to transform a(x) into a new polynomial b(x) which is a multiple of g(x), the remainder p(x) in (Eq. 2) can be subtracted from a(x) to form b(x) (see Eq. 3).

$$b(x) \equiv m(x)x^L - p(x) = m(x)x^L + p(x) \quad \text{(Eq. 3)}$$
$$= q(x)g(x)$$

It should be noted that the described mathematical calculations are performed over bits, which means the subtraction operation in GF(2) (i.e., "−") is mathematically equivalent to the addition operation in GF(2) "i.e., "+").

In (Eq. 3), q(x) is a polynomial with order equal to or less than k−1. It should be also noted that the actual transmission part is not m(x) but b(x).

An application of the CRC to a received signal will now be described. An error in the received signal may be detectable based on the remainder after dividing the received signal by the CRC generation polynomial g(x).

If the received signal has no error (for example, assuming that no error occurred in the channel), the received signal should be b(x) (i.e., the same as the transmitted signal). By its definition, b(x) is a multiple of the CRC generation polynomial g(x) such that the remainder after dividing the received signal (in this example, dividing b(x) by g(x)) should be 0. As such, with reference to Eq. 4, if the remainder when dividing the received signal by g(x) is equal to 0, then no error is to be declared.

$$b(x)/g(x) = q(x)g(x)/g(x) \quad \text{(Eq. 4)}$$
$$= q(x) + 0$$

If an error e(x) occurred in the channel, the received signal $b_E(x)$ should be a sum of the transmitted polynomial b(x) and error polynomial e(x). In more detail, the erroneous received signal $b_E(x)$ can be factored as in (Eq. 5) below.

$$b_E(x) \equiv b(x) + e(x) \quad \text{(Eq. 5)}$$
$$= m(x)x^{n-k} + p(x) + e(x)$$
$$= q(x)g(x) + e(x)$$

It can be concluded that the remainder of dividing the received signal by the CRC generating polynomial g(x) is equal to the error in the channel. If there is an error in the channel, the remainder should not be zero. In conclusion, if the remainder is not zero, then an error is to be declared.

In some instances, errors cannot be successfully detected using the CRC. Such an instance occurs when the error e(x) is also a multiple of the CRC generation polynomial g(x). That is, if the remainder of dividing the error polynomial e(x) by the CRC generation polynomial g(x) is 0, then the error e(x) cannot be detected. This is because the remainder of dividing $b_{UE}(x)$, the received signal with undetected error, by the CRC generation polynomial g(x) is also equal to zero, as if there was no error in the channel (see Eq. 6).

$$b_{UE}(x) \equiv b(x) + e_{UE}(x) \quad \text{(Eq. 6)}$$
$$= m(x)x^{n-k} + p(x) + e_{UE}(x)$$
$$= q'(x)g(x)$$
$$= q(x)g(x) + q_{UE}(x)g(x)$$

The undetected error $e_{UE}(x)$ should have the form of a multiple of g(x) (see Eq. 7).

$$e_{UE}(x) \equiv q_{UE}(x)g(x) \quad \text{(Eq. 7)}$$

An example of a usage of the CRC in an LTE system will now be described in more detail.

With respect to terminology, the input bit sequence to the CRC computation may be denoted as $a_0, a_1, a_2, a_3, \ldots, a_{A-1}$, and the parity bit sequence of the CRC may be denoted as $p_0, p_1, p_2, p_3, \ldots, p_{L-1}$. A is the size (i.e., length) of the input sequence, and L is the number of parity bits. The parity bits are generated by one of the following cyclic generator polynomials:

1) $g_{CRC24A}(D) = [D^{24} + D^{23} + D^{18} + D^{17} + D^{14} + D^{11} + D^{10} + D^7 + D^6 + D^5 + D^4 + D^3 + D + 1]$ (for a CRC of length L=24)

2) $g_{CRC24B}(D) = [D^{24} + D^{23} + D^6 + D^5 + D + 1]$ (for a CRC of length L=24); and 3) $g_{CRCL6}(D) = [D^{16} + D^{12} + D^5 + 1]$ (for a CRC length L=16).

The encoding is performed in a systematic form. Therefore, in GF(2), the polynomial:

$$a_0 D^{A+23} + a_1 D^{A+22} + \ldots + a_{A-1} D^{24} + p_0 D^{23} + p_1 D^{22} + \ldots + p_{22} D^1 + p_{23}$$

yields a remainder equal to 0 when divided by the corresponding length-24 CRC generator polynomial, $g_{CRC24A}(D)$ or $g_{CRC24B}(D)$. Similarly, the polynomial:

$$a_0 D^{A+15} + a_1 D^{A+14} + \ldots + a_{A-1} D^{16} + p_0 D^{15} + p_1 D^{14} + \ldots + p_{14} D^1 + p_{15}$$

yields a remainder equal to 0 when divided by $g_{CRC16}(D)$.

The bit sequence formed after the CRC is attached (or appended) to the input bit sequence $a_0, a_1, a_2, a_3, \ldots, a_{A-1}$ may be denoted as $b_0, b_1, b_2, b_3, \ldots, b_{B-1}$. This bit sequence has a length of B=A+L. The bits $b_0, b_1, b_2, b_3, \ldots, b_B$ of the bit sequence are defined as follows:

$b_k = a_k$, for $k=0, 1, 2, \ldots, A-1$ $b_k = p_{k-A}$, for $k=A, A+1, A+2, \ldots, A+L-1$.

Information of a broadcast channel (BCH) will now be described in more detail. The data transmitted in the BCH contains essential system and access configuration information that the UE requires in order to access the system. The BCH typically utilizes a relatively low coding rate as well as a 16-bit CRC, as described earlier. The system and access configuration information may be referred to as an information block (or the BCH transport block data). As such, the data transmitted in the BCH includes two distinct portions: the transport block data and the CRC parity bits, which are computed from the transport block data.

Figure 3:
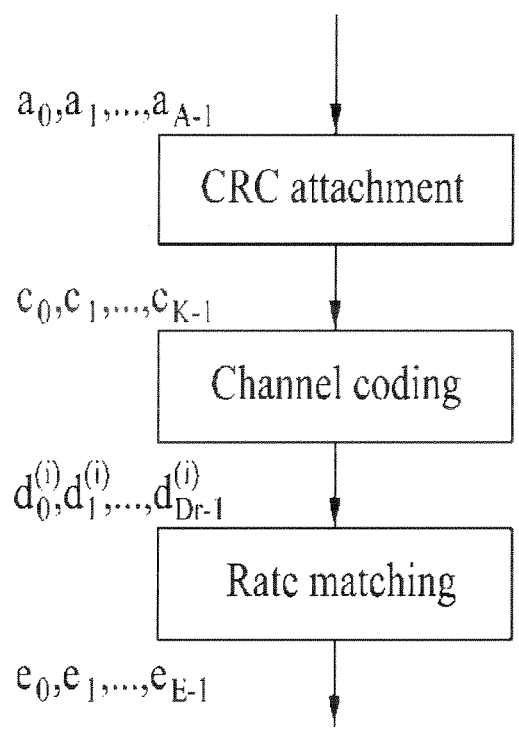
FIG. 3 is a coding flowchart.

With reference to FIG. 3, a processing flow for a broadcast channel (BCH) transport channel includes one or more coding steps. Data arrives to a coding unit in the form of a maximum of one transport block every transmission time interval (TTI) of 40 milliseconds (msec). This figure shows that a CRC is added to the transport block in an CRC attachment operation. Next, channel coding is performed, followed by the performing of rate matching. If desired, error detection may be provided on BCH transport blocks through a CRC.

The entire transport block is often used to calculate the CRC parity bits. The bits in a transport block, as delivered to layer 1 (see, for example, the above description regarding FIGS. 2(b) and 2(c)), may be denoted as $a_0, a_1, a_2, a_3, \ldots, a_{A-1}$, and the parity bits may be denoted asp $p_0, p_1, p_2, p_3, \ldots, p_{L-1}$. A is the size of the transport block, and L is the number of parity bits.

The L parity bits may be computed and attached to the BCH transport block, where L is equal to 16 bits. After the attachment, the CRC bits are scrambled according to a eNode-B transmit antenna configuration. With reference to Table 1 below, different transmit antenna configurations correspond to different numbers of transmit antennas used at the eNodeB. Further, each transmit antenna configuration corresponds to a respective mask having the form $X_{ant,0}, X_{ant,1}, \ldots, X_{ant,15}$.

TABLE 1

CRC mask for PBCH

| Number of transmit antenna ports at eNode-B | PBCH CRC mask $<x_{ant,0}, x_{ant,1}, \ldots, x_{ant,15}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

In some embodiments, up to four or more antennas are employed. Therefore, there are three masking patterns in Table 1, to correspond to three different antenna configurations (e.g., 1 antenna in use, 2 antennas in use, and 4 antennas in use). So that the receiver (e.g., UE 10 of FIG. 1) can determine the transmit antenna configuration used at the eNodeB, the CRC is scrambled using the mask according to that particular configuration. During scrambling, the CRC bit $p_n$ ($0 \leq n \leq 15$) is inverted if $x_{ant,n}$ is equal to 1 and left unchanged if $x_{ant,n}$ is equal to 0. After scrambling, the sequence $c_0, c_1, c_2, c_3, \ldots, c_{K-1}$ is formed, the bits of which are defined as follows:

$c_k = a_k$, for $k = 0, 1, 2, \ldots, A-1$ $c_k = (p_{k-A} + x_{ant,k-A}) \bmod 2$, for $k = A, A+1, A+2, \ldots, A+15$.

The structure of the transport block will now be described in more detail. LTE transmissions are generally segmented into frames of 10 msec duration. Each frame is divided into 10 sub-frames.

Figure 4:
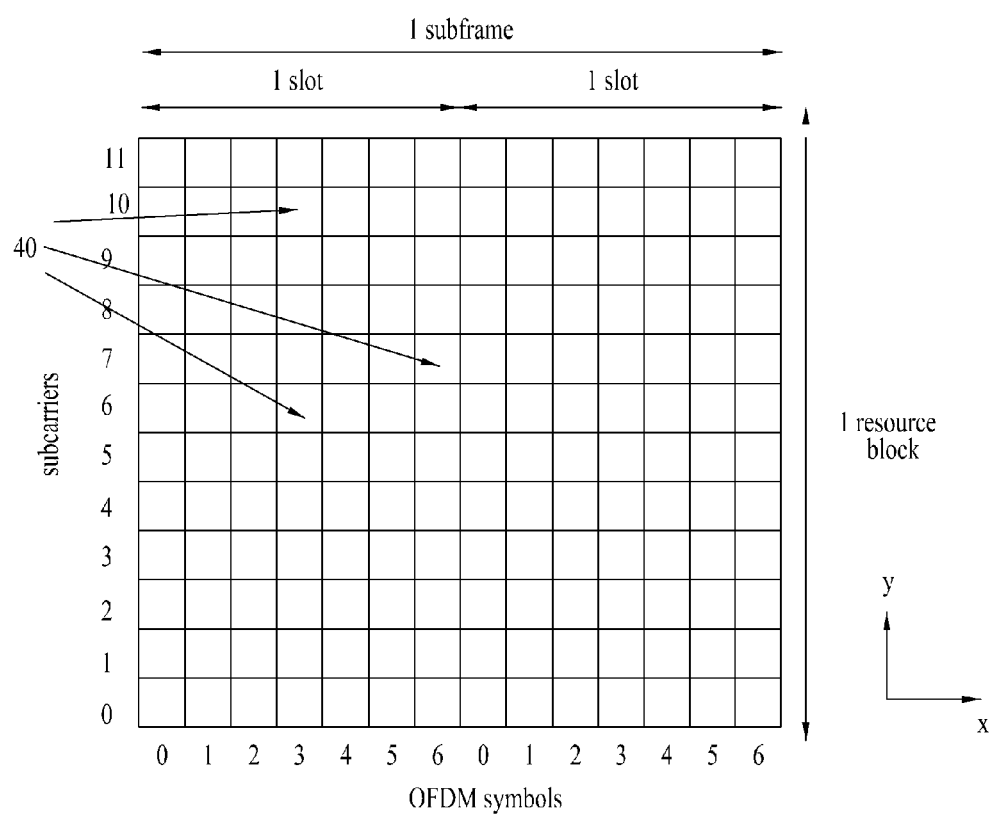
FIG. 4 shows a portion of a resource grid corresponding to a subframe.

With reference to FIG. 4, a partial resource grid corresponding to 1 subframe is shown. The subframe is divided into two slots along the time axis (x-axis). Within each slot of the subframe, OFDM symbols (numbering either 6 or 7) are transmitted. For example, as illustrated in FIG. 4, each slot includes seven OFDM symbols (symbols #0, #1, #2, #3, #4, #5 and #6). Along the frequency axis (y-axis) of FIG. 4, a resource block (RB) corresponds to 12 consecutive subcarriers. The total number of resource blocks (spanning a certain multiple of 12 subcarriers) corresponds to the overall transmission bandwidth. As an example, each block 40 within the grid (i.e., the smallest unit, corresponding to one OFDM symbol and one subcarrier, as depicted in FIG. 4) is referred to as a resource element (RE).

Figure 5:
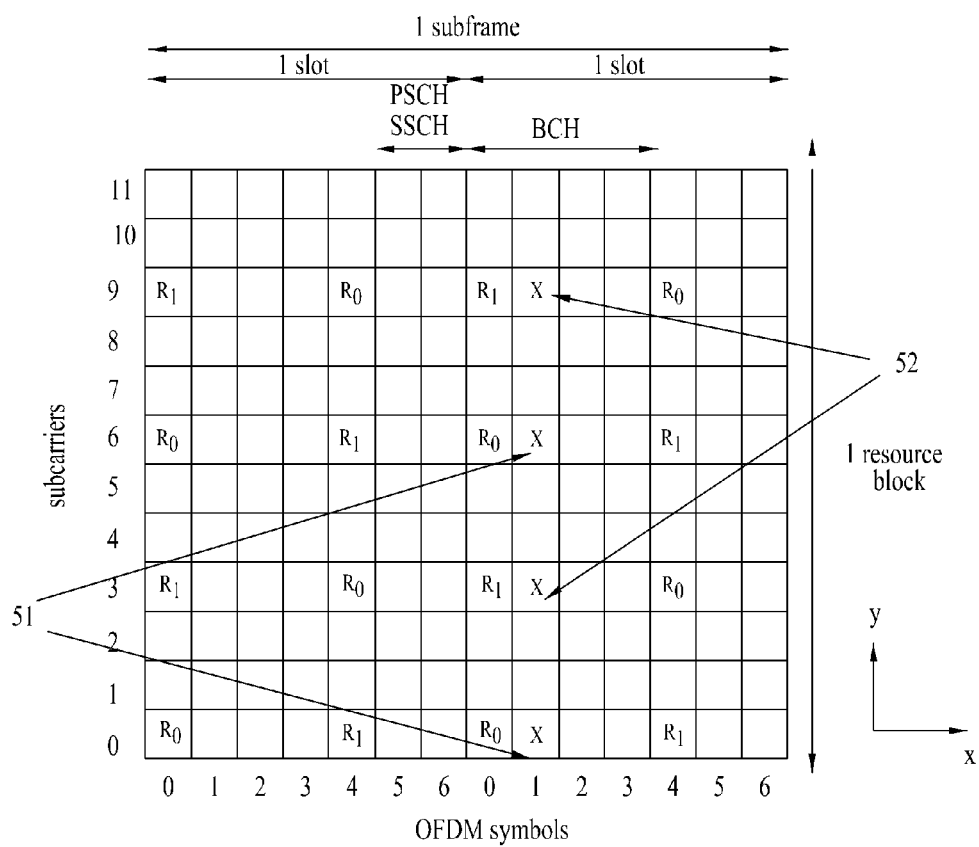
FIG. 5 shows a partially filled resource grid corresponding to a subframe.

With reference to FIG. 5, a partially filled resource grid corresponding to 1 subframe is shown. According to some embodiments, the BCH is transmitted on OFDM symbols #0, #1, #2 and #3 in the second slot of one subframe of each frame. This subframe corresponds to the first sub-frame (sub-frame #0) of each frame. Along the frequency axis (the y-axis of FIG. 5), the BCH may span 6 resource blocks. As previously noted, each resource block spans 12 subcarriers.

With continued reference to FIG. 5, as one example, certain resource elements are reserved for reference signals/symbols corresponding to different transmit antennas. In the BCH, the resource elements labeled "$R_0$" are reserved for transmit antenna port #1. Also in the BCH, the resource elements labeled "$R_1$" are reserved for transmit antenna port #2. With respect to the frequency axis, the resource elements R1 are spaced apart by five subcarriers (i.e., they appear on every sixth subcarrier). Similarly, the resource elements $R_0$ are spaced apart by five subcarriers. The resource elements $R_1$ are unused in transmissions by antenna port #1 transmission, and the resource elements $R_0$ are unused in transmissions by antenna port #2.

Also in the BCH, the resource elements labeled "X" are reserved for transmit antenna ports #3 and #4. More specifically, the resource elements 51 are reserved for transmit antenna port #3, and the resource elements 52 are reserved for transmit antenna port #4. The resource elements 51 share a subcarrier with the resource elements $R_0$ in the BCH. Similarly, the resource elements 52 share a subcarrier with the resource elements $R_1$ in the BCH. However, with respect to the resource elements $R_0$ and $R_1$, the resource elements 51 and 52 are on a different OFDM symbol. In antenna diversity schemes using only 2 transmit antenna ports (i.e., ports #1 and #2), the resource elements 51 and 52 may be reserved but not used.

Figure 6:
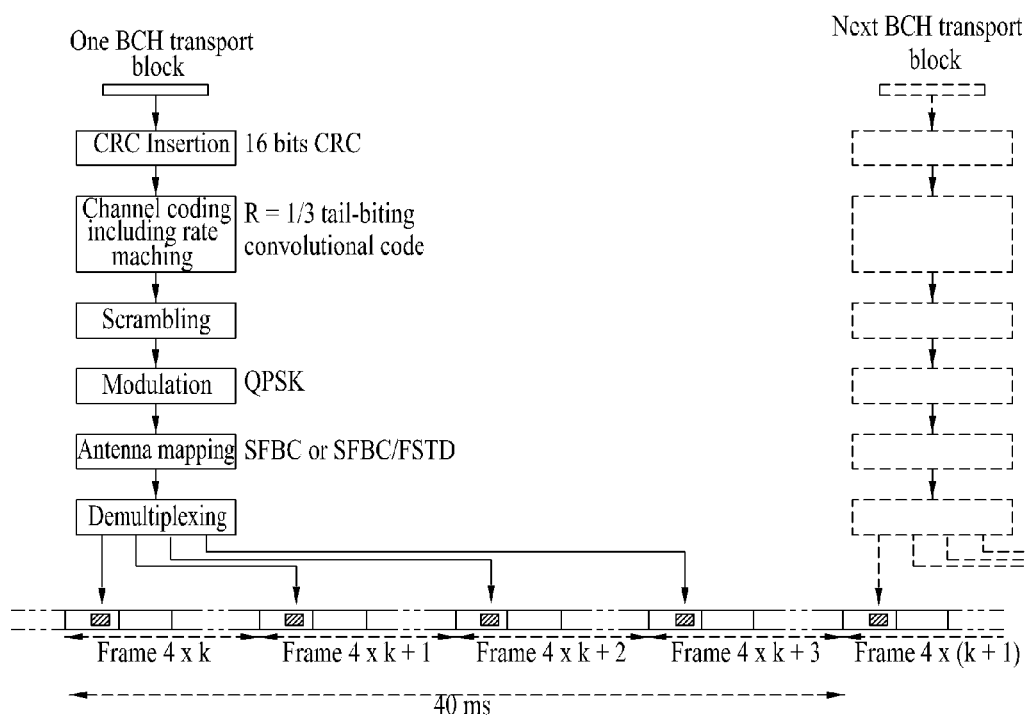
FIG. 6 shows a timing diagram for a coded BCH transport block.

With reference to the timing diagram of FIG. 6, the coded BCH transport block is spread over 4 frames. As each frame corresponds to 10 msec, the transmit time interval of the BCH is equal to 40 msec. Transmitted along with the BCH are synchronization signals such as primary synchronization signals (e.g., PSCH of FIG. 5) and secondary synchronization signals (e.g., SSCH of FIG. 5). As previously noted, the BCH occupies 6 resource blocks (RB), each of which corresponds to 12 subcarriers with 15 kHz subcarrier spacing.

Since more than one antenna can be exploited in BCH transmission, reference signals for such a number of antennas (e.g., signals occupying the reserved resource elements $R_0$, $R_1$) are also required. A UE receiving the BCH can learn the number of antennas used in the system upon decoding the BCH. As previously described with reference to Table 1, the antenna configuration of the system may be encoded by masking the CRC appended to the BCH transport block.

The maximum number of antennas that can be utilized is usually predetermined. It is common for some systems, such as LTE Release 8, to use a maximum number of 4 antennas. This maximum number of antennas is assumed in the resource mapping for the BCH; as such, resource elements for 4 antennas are reserved (see, e.g., resource elements 51, 52 of FIG. 5). These resource elements are reserved irrespective of the actual number of antennas used. In the illustrated example the maximum number of antennas is 4, which means the resources for 4 transmission antennas are reserved when mapping resources for the BCH. As such, if only 1 or 2 antennas are used, resource elements 51, 52 for the third and the fourth antennas are reserved but are not used. Therefore, these resource elements are left unoccupied (see, for example, FIG. 5).

Figure 7:
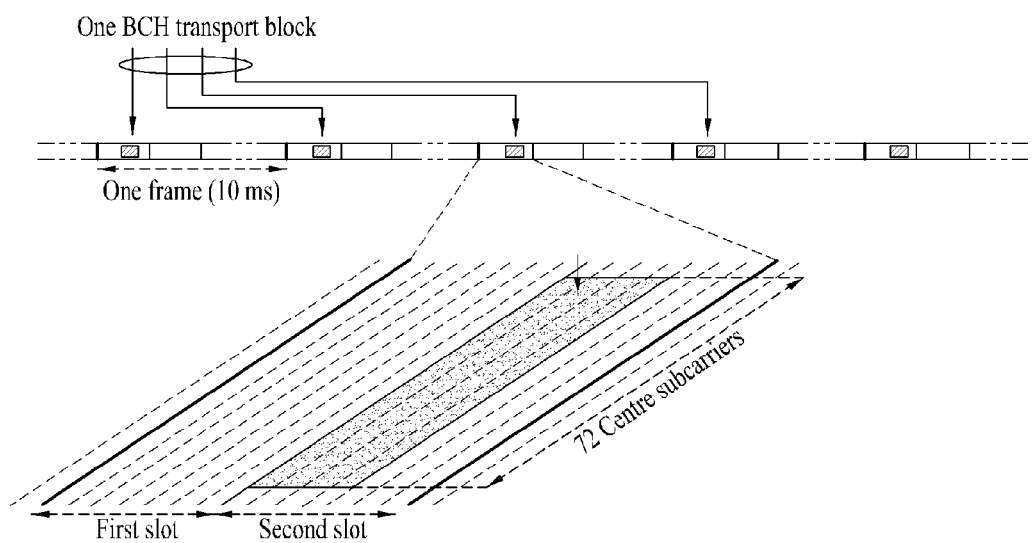
FIG. 7 shows resource elements for usage during BCH transmission.
Figure 8:
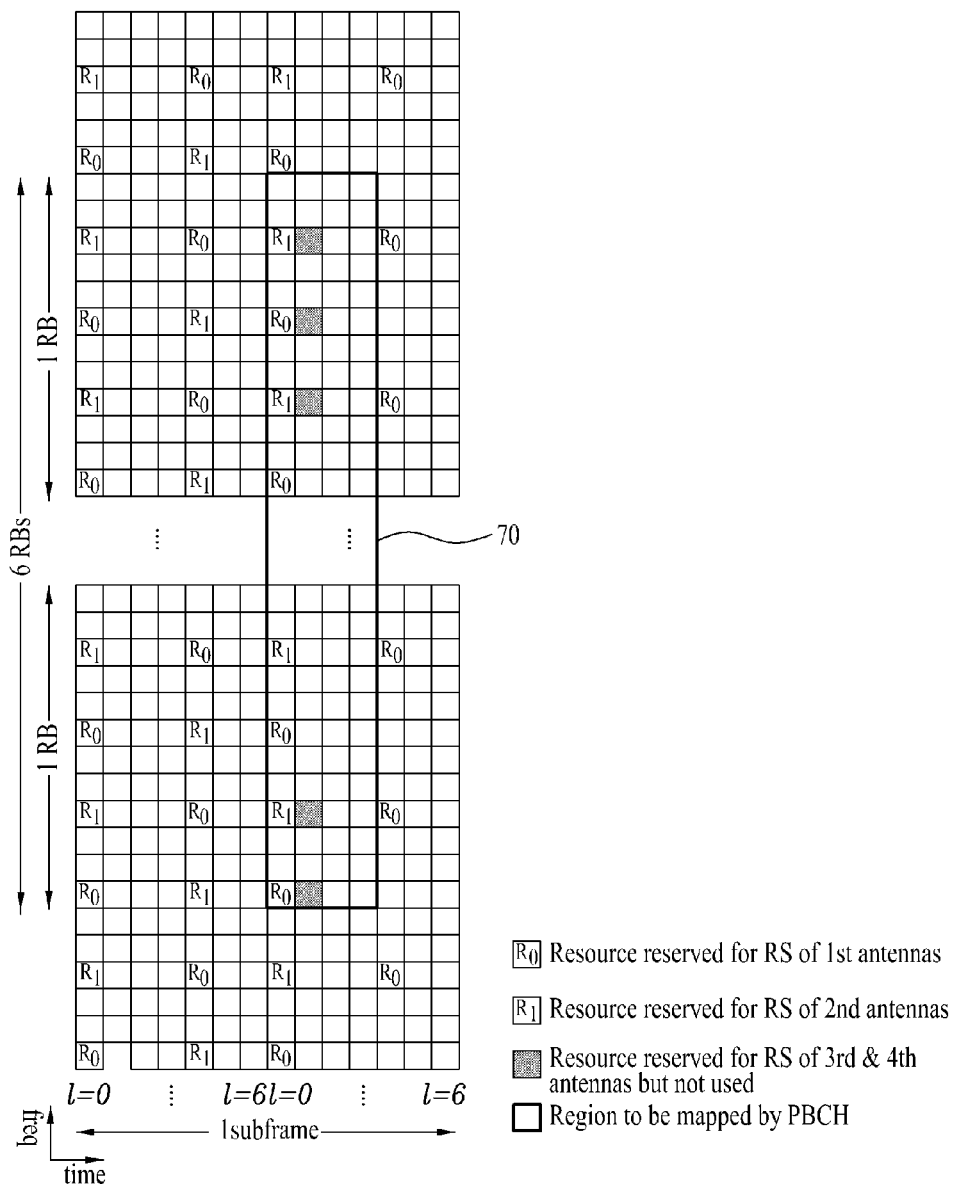
FIG. 8 shows resource elements for usage during BCH transmission.
Figure 9:
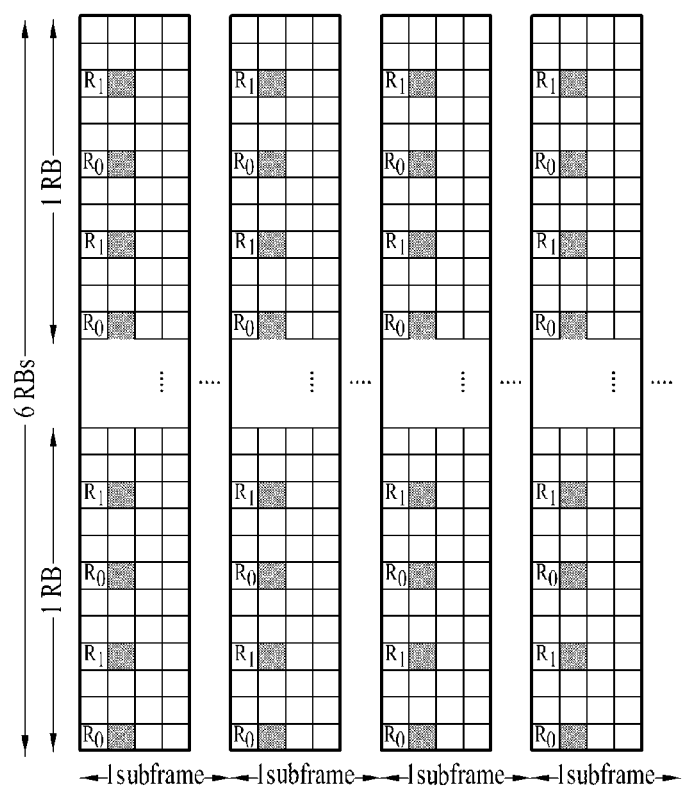
FIG. 9 shows resource elements for usage during BCH transmission over four subframes.

With reference to FIGS. 7 and 8, the resource elements within area 70 depict the resources which can be used by BCH transmission. In each subframe, the BCH occupies 4 OFDM symbols spanning 6 RBs. Furthermore, the BCH is transmitted over a total of 4 subframes (i.e., 1 subframe in each of 4 different frames). Therefore, when 1 or 2 antennas are used, the total number of resource elements reserved but not used (i.e., the resource elements reserved for the third and fourth antennas) is at least 96.

More generally, LTE system information is delivered by two different mechanisms relying on two different transport channels: these mechanisms are the Master Information Block (MIB) and the System Information Block (SIB). A smaller amount of system information, corresponding to the MIB, is transmitted using the BCH. A larger portion of the system information, corresponding to different SIBs, is transmitted using the downlink share channel (DL-SCH). As mentioned above, the MIB transmitted using the BCH typically includes a very limited amount of the system information that is useful for a terminal, such as UE 10, to be able to read the remaining system information provided using the DL-SCH.

In more detail, the Master Information Block carries the system information as illustrated in FIG. 10. With reference to FIG. 10, the field labeled "dl-Bandwidth" (or $N_{RB}$) is a field indicating a transmission bandwidth configuration, which is the highest transmission bandwidth allowed for downlink (or uplink) in a given channel bandwidth. The parameter in this field is expressed in units of resource blocks. For example, n6 (an enumerated value of this parameter) corresponds to 6 resource blocks. Similarly, n15 (another enumerated value of this parameter) corresponds to 15 resource blocks.

As an example, PHICH-config (FIG. 10) may include parameters to decide the transmission method for the PHICH (Physical Hybrid Channel) i.e. PHICH resource parameter $N_g \in \{1/6, 1/2, 1, 2\}$ and the PHICH duration parameter $m \in \{1, 2, 3\}$.

The field labeled "systemFrameNumber" carries the 8 most significant bits of the system frame number (SFN), as described in, for example, 3GPP TSG 36.211. The 2 least significant bits of the SFN may be acquired by decoding the BCH. Within a 40 msec TTI: the first radio frame corresponds to 2 least significant bits of "00"; similarly, the second radio frame corresponds to "01"; the third radio frame corresponds to "10"; and the last radio frame corresponds to "11". With continued reference to FIG. 10, a spare bit string having a length of 10 bits is unused.

In some embodiments, the eNodeB may be capable of using more than 4 antennas. For example, the eNodeB may be capable of using up to 8 antennas, or more. Therefore, the number of antennas (and, therefore, the number of antenna configurations) may vary according to the release under which a device (e.g., UE 10 of FIG. 1) is configured to operate. For example, a first group of UEs in a system may be configured to operate under LTE release 8, and a second group of UEs in the system may be configured to operate under LTE Advanced (a release later than release 8—e.g., release 9 or release 10). Various embodiments presented herein are useful for providing antenna configuration information to the second group of UEs in an independent manner. That is, antenna configuration information spanning up to 8 antennas is provided to the second group of UEs, without affecting the ability to provide antenna configuration information spanning up to 4 antennas to the first group of UEs. As such, full backward compatibility (at least with regard to the antenna configuration information of the BCH) is maintained.

As described above, the indication of antenna configuration information may be based on the CRC masking described with reference to Table 1. One approach to accommodate system changes, such as that encountered in LTE Advanced where up to 8 antennas may be employed, is to introduce new CRC masking patterns—that is, to provide four masking patterns to correspond to the four different antenna configurations associated with a total of 8 antennas. As described with reference to Table 1, only three masking patterns were used to correspond to three different antenna configurations. An example of such masking patterns, along with the masking patterns of Table 1, is presented in Table 2 below.

To enhance flexibility with regard to varying antenna configurations, an independent set of CRC masks (i.e., a wholly separate set of CRC masks) may be used to indicate the 4 antenna configurations in LTE Advanced, for example. However, duplicated usage of CRC masks is generally not separately detected in the receiver side. As such, it may be desirable to use only a single CRC mask at a one time. It is understood that the arrangement of Table 2 generally does not support independent indication of antenna configurations for differently operating system such as, for example, LTE release 8 and LTEA.

TABLE 2

CRC mask for PBCH

| Spec | Number of transmit antenna ports at eNode-B | PBCH CRC mask $<x_{ant,0}, x_{ant,1}, \ldots, x_{ant,15}>$ |
|---|---|---|
| LTE R8 | 1 | <0, 0, 0, 0, 0, 0, 0, 0, 0, 0, 0, 0, 0, 0, 0, 0> |
|  | 2 | <1, 1, 1, 1, 1, 1, 1, 1, 1, 1, 1, 1, 1, 1, 1, 1> |
|  | 4 | <0, 1, 0, 1, 0, 1, 0, 1, 0, 1, 0, 1, 0, 1, 0, 1> |
| LTEA | 1 | <1, 0, 1, 0, 1, 0, 1, 0, 1, 0, 1, 0, 1, 0, 1, 0> |
|  | 2 | <0, 0, 1, 1, 0, 0, 1, 1, 0, 0, 1, 1, 0, 0, 1, 1> |
|  | 4 | <1, 1, 0, 0, 1, 1, 0, 0, 1, 1, 0, 0, 1, 1, 0, 0> |
|  | 8 | <0, 0, 0, 0, 1, 1, 1, 1, 0, 0, 0, 0, 1, 1, 1, 1> |

Although implementing antenna configurations in accordance with Table 2 is useful in many respects, alternatives exist in accordance with further embodiments of the present invention. For instance, one approach is based on an undetected (or undetectable) error pattern of the CRC.

Since the indication of antenna configuration information may occur based on the CRC masking of Table 1, if a new mask is generated using an undetectable error pattern of the CRC which is used in a differently operating system (e.g., LTE release 8), then this new mask pattern will typically not have any negative effect on this different operating method. This is because the differently operating system may implement an approach that utilizes the result of checking the CRC according to the masks. If the additional patterns utilized for later releases are based on an undetectable error pattern, then the CRC check result is left unchanged.

In more detail, as previously noted, the CRC polynomial in LTE release 8, as an example, is $g_{CRC16}(D)=[D^{16}+D^{12}+D^{5}+1]$. The binary representation of this polynomial is 10001000000100001 where the leftmost bit is a MSB and the rightmost bit is a LSB. An undetectable error pattern should be a multiple of CRC generation polynomial $g_{CRC16}(D)$; the simplest pattern could be the CRC generation polynomial itself which, as noted above, has a 17-bit binary representation.

Since the LTE release 8 masking pattern is composed of 16 bits (e.g., Table 1), the masking pattern spans only the length of the 16-bit CRC. As such, the mask pattern is applied only to the CRC portion of the transmission without interfering with other portions of the transmission (e.g., the data portion). That is, in this example, the existing masking patterns affect the values of only the CRC bits and not any other bits (e.g., the data bits). However, a new mask pattern based on the undetectable error pattern (e.g., a pattern of 17 or more bits) would affect not only the CRC portion but would also overlap with a portion of the data portion.

Furthermore, 4 mask patterns may be utilized since 4 antenna configurations may be supported in later releases of the LTE specification. The possible 4 mask patterns should respectively correspond to multiples of the CRC generation polynomial $g_{CRC16}(D)$. Such multiples may include $g_{CKC16}(D)*0$, $g_{CRC16}(D)*1$, $g_{CRC16}(D)*D$, and $g_{CRC10}(D)*(D+1)$, which have binary representations of 00000000000000000, 10001000000100001, 100010000001000010, and 110011000001100011, respectively. These binary representations require up to 18 bits are required in order to cover the range of antenna configuration.

Although the new mask patterns require 2 additional bits compared with the 16-bit mask pattern of other implementations (e.g., LTE release 8), such that 2 bits of the data portion (i.e., the 2 least significant bits of the data portion) will be affected, and the new mask patterns will not have any effect on the CRC check result of the existing implementation. As described previously, the CRC check result is not affected because the mask patterns correspond to multiples of the CRC generation polynomial $g_{CRC16}(D)$. However, the new CRC pattern itself cannot be also detected using CRC check method due to the fact that it has the form of CRC generation polynomial. Therefore, the last 2 bits in the data part may be reserved as a fixed pattern so that reading the last 2 bits in the data part could be used to indicate additional numbers of antennas.

One example of this mask is shown in Tables 3a and 3b below. It is again emphasized that reference to LTE R8, LTEA, and other versions, is by way of example only to illustrate features of various embodiments of the present invention, and that such embodiments are not limited to such releases.

As previously described, in certain masks, the 2 bits $y_{ant,0}$ and $y_{ant,1}$ overlap a portion (the last 2 bits) of the PBCH data portion. Further, it is understood that the mapping between these masks and the particular antenna configuration could be changed.

TABLE 3a mask for PBCH in LTEA

| Spec | Number of transmit antenna ports at eNode-B | PBCH CRC mask $<x_{ant,0}, x_{ant,1}, \ldots, x_{ant,15}>$ |
|---|---|---|
| LTE R8 | 1 | <0, 0, 0, 0, 0, 0, 0, 0, 0, 0, 0, 0, 0, 0, 0, 0> |
| | 2 | <1, 1, 1, 1, 1, 1, 1, 1, 1, 1, 1, 1, 1, 1, 1, 1> |
| | 4 | <0, 1, 0, 1, 0, 1, 0, 1, 0, 1, 0, 1, 0, 1, 0, 1> |

TABLE 3b mask for PBCH in LTEA

| Spec | Number of transmit antenna ports at eNode-B | New mask for PBCH $<y_{ant,0}, y_{ant,1}, \ldots, y_{ant,15}, y_{ant,16}, y_{ant,17}>$ |
|---|---|---|
| LTEA | 1 | <0, 0, 0, 0, 0, 0, 0, 0, 0, 0, 0, 0, 0, 0, 0, 0, 0, 0> |
| | 2 | <0, 1, 0, 0, 0, 1, 0, 0, 0, 0, 0, 1, 0, 0, 0, 0, 0, 1> |
| | 4 | <1, 0, 0, 0, 1, 0, 0, 0, 0, 0, 1, 0, 0, 0, 0, 1, 0> |
| | 8 | <1, 1, 0, 0, 1, 1, 0, 0, 0, 0, 0, 1, 1, 0, 0, 0, 1, 1> |

Since the masks of Tables 3a and 3b typically affect not only the CRC portion but also the data portion, the processing of the received BCH information should be changed accordingly. One example of CRC definition and masking of the CRC and data portions will now be described.

In some situations, the entire transport block may be used to calculate the CRC parity bits. The bits in a transport block delivered to layer 1 are denoted as $a_0, a_1, a_2, a_3, \ldots, a_A$, and the parity bits are denoted as $p_0, p_1, p_2, p_3, \ldots, p_{L-1}$, where A is the size of the transport block and L is the number of parity bits.

The parity bits of length 16 bits are computed and attached to the BCH transport block. After the attachment, the CRC bits are scrambled according to the eNode-B transmit antenna configuration with the sequence $x_{ant,0}, x_{ant,1}, \ldots, x_{ant,15}$ and $y_{ant,0}, y_{ant,1}, \ldots, y_{ant,15}, y_{ant,16}, y_{ant,17}$ as indicated in Table 3b to form the sequence of bits $c_0, c_1, c_2, c_3, \ldots, c_{K-1}$ where, according the LTE and LTEA examples presented herein, In LTE;

$c_k = a_k$, for $k=0, 1, 2, \ldots, A-1$ $c_k = (p_{k-A} + x_{ant,k-A}) \mod 2$, for $k=A, A+1, A+2, \ldots, A+15$.

In LTEA;

$c_k = a_k$ for $k=0, 1, 2, \ldots, A-3$ $c_k = (a_k + y_{ant,k-A+2}) \mod 2$ for $k=0, 1, 2, \ldots, A-3$ $c_k = (p_{k-A} + y_{ant,k-A+2}) \mod 2$ for $k=A, A+1, A+2, \ldots, A+15$ This approach utilizes 2 additional bits in the mask pattern relative to the CRC length of 16 bits. In addition, the last 2 bits in the data portion may have a fixed pattern (i.e., fixed in value) in order to enable the receiver to decode the number of antennas. If these last 2 bits in the data portion are reserved and filled with known bits, then these last 2 bits generally do not carry meaningful information.

An approach according to various embodiments will now be described. As described above, the last 2 bits in the data portion may be filled with known bits to facilitate masking with 18-bit masks. It is possible to use these 2 bits of the data portion to indicate the number of antennas. In such an embodiment, the extended 18-bit mask would not be required. However, such a use of bits in the data portion may have adverse effects on devices configured under LTE release 8, for example.

According to one embodiment, an LTEA antenna configuration information is carried in the MIB, as transmitted in the BCH (e.g., FIG. 11). As previously described with reference to FIG. 10, the MIB includes a spare bit string having a length of 10 bits. The 10 bits of this bit string are not interpreted by devices configured under the LTE release 8. Therefore, the use of any of these bits (e.g., to carry LTEA antenna configuration) would not raise backward compatibility issues. According to embodiments of the invention, 2 (or more) bits of the spare bit string are used as a field to carry the LTEA antenna configuration information.

Since these 2 bits in the data portion would be used before CRC definition and attachment, the selection of which 2 bits (among the 10 bits of the spare bit string) need not be confined to any particular portion of the bit string—e.g., the last part (or the least significant portion) of the bit string. Rather, the 2 bits may be selected from any of the 10 bits of the bit string. If desired, the selected two bits are either contiguous or non-contiguous.

According to a particular embodiment, the 2 bits are contiguous, and they take on the values specified in Table 4 below. With reference to Table 4, the value of the 2 bits varies according to the particular antenna configuration that is utilized. Table 4 illustrates only one particular mapping between antenna configuration and the values of the 2 bits in the above-described MIB field. It is understood that other mappings (between antenna configuration and values of the MIB field) may be used.

TABLE 4

MIB field detail for LTEA

| Spec | Number of transmit antenna ports at eNode-B | MIB field definition in number of antennas in LTEA (binary) |
|---|---|---|
| LTEA | 1 | 00 |
| | 2 | 01 |
| | 4 | 10 |
| | 8 | 11 |

An approach according to another embodiment relates to an LTEA antenna configuration information that is carried in reserved resource elements of the BCH that are currently unused. As previously described (e.g., FIG. 5), the resource mapping for the BCH assumes the utilization of the maximum number of antennas in a particular release, such as LTE Release 8 (i.e., 4 antennas). However, it can reasonably be assumed that the number of antennas utilized in practice in LTE release 8 is at most a particular value, such as 2. This is because it is believed that there are few (if any) commercially available eNodeBs that support 4 transmit antennas. As such, although resource elements are reserved for use by the third and fourth antenna ports (see, for example, FIG. 5), systems in LTE release 8 do not look to these reserved resource elements.

Figure 13:
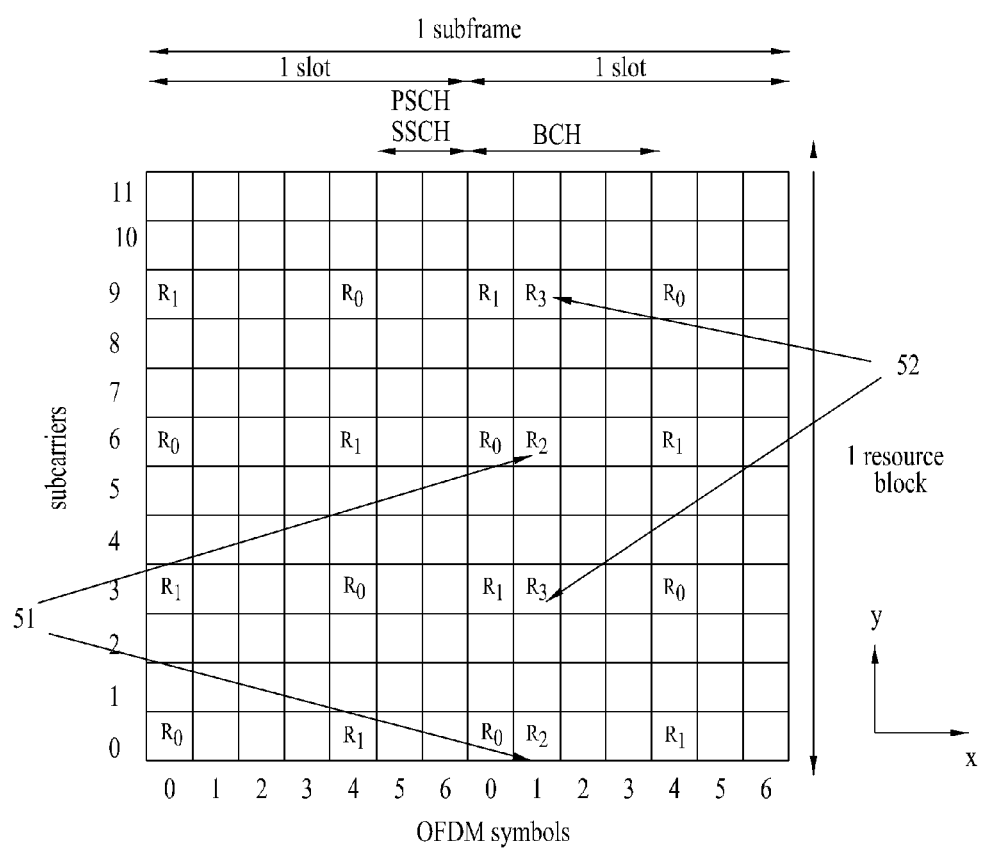
FIG. 13 shows a partially filled resource grid corresponding to a subframe according to one embodiment.

According to one embodiment, with reference to FIG. 13, information is carried via the resource elements 51, 52 reserved in the BCH for the third and fourth antenna ports #3 and #4 are used to carry information. According to an exemplary embodiment, the information relates to an indication of the antenna diversity scheme (i.e., the number of antennas) for a given implementation such as LTEA. Some systems may not look to the reserved resource elements 51, 52. Therefore, such a use of these resource elements would not raise backward compatibility issues with devices configured according to LTE release 8.

With reference to FIG. 13, according to one embodiment, one or more of resource elements 51 and one or more of resource elements 52 are utilized to convey information regarding a diversity scheme of up to 8 antennas. A particular coding of this information is illustrated in Table 5 below. For example, when the number of transmit antenna ports utilized by an eNodeB is 1, (the symbol(s) of) one or more of resource elements 51 is used to carry a binary value of 0, and (the symbol(s) of) one or more of resource elements 52 is used to carry a binary value of 0. Similarly, when the number of transmit antenna ports utilized by the eNodeB is 2, resource elements 51 are used to carry a binary value of 0, and resource elements 52 are used to carry a binary value of 1.

Similarly, when the number of transmit antenna ports utilized by the eNodeB is 4, resource elements 51 are used to carry a binary value of 1, and resource elements 52 are used to carry a binary value of 0. Similarly, when the number of transmit antenna ports utilized by the eNodeB is 8, resource elements 51 are used to carry a binary value of 1, and resource elements 52 are used to carry a binary value of 1.

It is understood that, according to other embodiments, the mapping between the number of antennas and the values described above with reference to Table 5 (below) may be varied.

TABLE 5

RS (reference signal) field detail for LTEA

| Spec | Number of transmit antenna ports at eNode-B | RS bit field definition in number of antennas in LTEA $<RS_{ant\,port\,2}, RS_{ant\,port\,3}>$ |
|---|---|---|
| LTEA | 1 | <0, 0> |
| | 2 | <0, 1> |
| | 4 | <1, 0> |
| | 8 | <1, 1> |

For example, in the above Table 5, the 1-antenna configuration is mapped to an effective binary codeword of "00", and the 2-antenna configuration is mapped to an effective binary codeword of "01". This mapping may be changed such that the 1-antenna configuration is mapped to the codeword "01" and the 2-antenna configuration is mapped to the codeword "00". It is understood that other such variations are within the scope of the present disclosure. Therefore, it is understood that Table 5 shows but one example of a mapping between antenna schemes and codewords, and that variations of these assignments may also be suitable.

According to one embodiment, only one of the reserved resource elements 51 and only one of the reserved resource elements 52 are used to carry the antenna configuration information. Each subframe carries 24 resource elements 51, 52, and the subframes of one TTI carry 96 such unused resource elements. According to another embodiment, an additional one or more (up to 47) of the remaining reserved resource elements 51 and an additional one or more (up to 47) of the remaining reserved resource elements 52 are used to carry the information. As such, as many as of the 96 reserved elements may be used to carry the information. This corresponds to a repetition of values, as specified, for example, in Table 5. It is appreciated that a higher number of repetitions typically results in a higher likelihood of successful detection by a UE. As such, the number of repetitions may be selected to achieve the desired likelihood of successful detection. According to another embodiment, a quadrature-phase-shift-keying (QPSK) symbol is carried in one or more of the REs. For example, one mapping of antenna schemes to points of a QPSK constellation is shown in Table 6 (below). As with the mapping of Table 5, it is understood that variations of the mapping shown in Table 6 are within the scope of the present disclosure.

Because a QPSK symbol may be fully carried by each one of the resource elements 51, 52, the number of possible repetitions, as compared to the embodiment of Table 5 (where two binary values are carried over two resource elements) is effectively doubled. As such, the indication of the antenna scheme may be repeated 96 times (rather than by merely 48 times) in one TTI. This would further improve the likelihood of successful detection. It is understood that the values in the right-hand column of Table 6 represent constellation points and not binary sequences (as shown, for example, in Table 5).

TABLE 6

RS field detail for LTEA

| Spec | Number of transmit antenna ports at eNodeB | RS field constellation points according to the number of antennas in LTEA $<RS_{ant\,port\,2}, RS_{ant\,port\,3}>$ |
|---|---|---|
| LTEA | 1 | <1, 1> |
|  | 2 | <j, j> |
|  | 4 | <−1, −1> |
|  | 8 | <−j, −j> |

Figure 12:
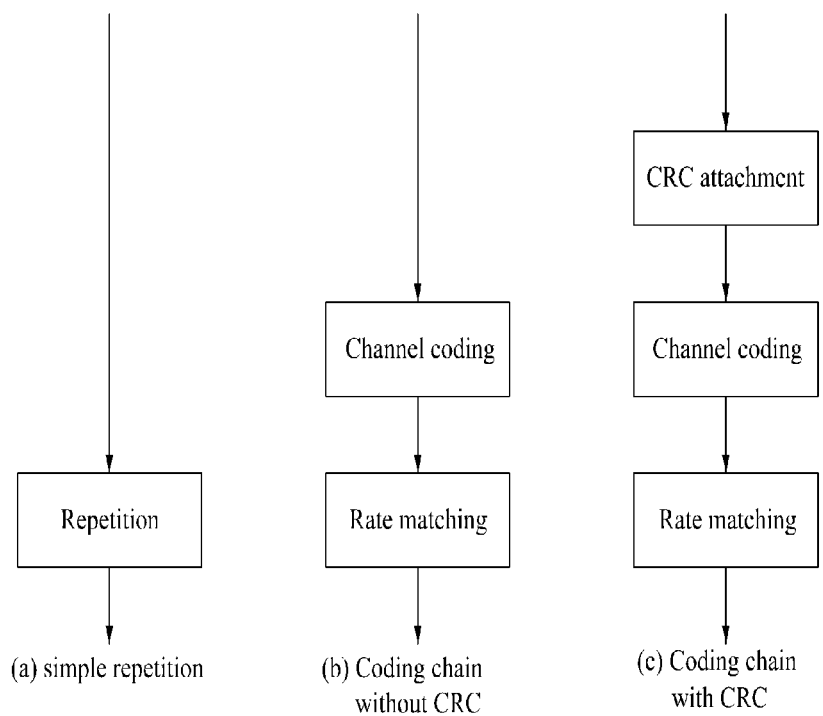
FIG. 12 shows coding flowcharts according to certain embodiments.

The number of symbol(s) or bit(s) to be transmitted in two reserved RSs (reference signals) is relatively small. According to embodiments of the invention, such symbols are repeated to a large degree. Repetition coding is a relatively simple coding scheme. According to further embodiments, another coding scheme such as convolutional coding could be used in two reserved RSs in order to provide more coding gain. Also, additional error detection capability may be provided by appending a CRC at the end of the data symbol(s) or bit(s). Coding chains according to various embodiments are depicted in FIG. 12.

According to one embodiment, the two reserved but not used RSs can be transmitted via the first antenna for maximum commonality. Since the number of antennas in the system could be one or two, it may be safe to consider that the two reserved RSs are to be transmitted using the first antenna. When the two reserved RSs are to be conveyed using the first antenna, the reference signal of the first antenna may be reused for the coherent detection.

According to other embodiments, instead of repetition of predetermined symbol(s) or bit(s) in the two reserved RSs, signature sequences may be assigned to the number of antennas and transmitted. In this example, the total number of available resource elements for two reserved RSs is 96. As such, length-96 signature sequences may be used to indicate the number of antennas in this system. Furthermore, sequence detection may be performed using the correlation between sequences without any reference signal. As such, a receiver detects the sequences non-coherently. In the case of non-coherent detection, two reserved RSs may be used to indicate the port number of the new antennas and may be transmitted using any suitable antenna configuration.

Consider again the scenario that the number of antennas is no more than two. Under this example, resource elements that are reserved for (transmit) antenna ports #3 and #4 are unused by any antenna. As such, each subframe carries 24 unused resource elements, and the subframes of one TTI carry 96 such unused resource elements. Such unused resource elements may be suitable for carrying other pieces of control information. According to embodiments of the invention, other forms of control information (e.g., control information other than antenna diversity schemes) are carried by these resource elements. For example, such control information may include the parameters additionally required for home eNodeB operation, the indication of status of the eNodeB such as back hole quality, or the notification of eNodeB type such as macro eNodeB, pico eNodeB, home eNodeB or relay Node. Still other control information having relatively short length may also be delivered using this reserved area.

According to embodiments of the invention, the number of antennas utilized in an LTE Advanced system may be indicated without disrupting indication schemes that are employed in LTE. In a release 8 LTE system, the number of antennas (which can up to 4) is transmitted via CRC masking in PBCH. In LTE Advanced (or releases that follow LTE, release 8), the number of antennas could be up to 8 or more. Therefore, the number of antennas under later Releases can be different from (e.g., larger than) the number of antennas under a release 8 LTE system. The larger number of antennas may require a need for an indication scheme that is different from the scheme that is utilized in LTE. However, the indication schemes utilized in later releases should not interfere with existing schemes under release 8. Aspects of the present disclosure are directed to providing methods of indicating the number of antennas used in LTE Advanced, and other systems as well, without corrupting the existing or other indicating schemes.

According to embodiments of the invention, apparatuses (e.g., mobile devices) are consistent (or compatible) with indication schemes described herein, relating to the indication of number of antennas used in LTE Advanced. In particular, such devices compatible with indication schemes for independent indication of the number of antennas used in both LTE Advanced and LTE.

Figure 14:
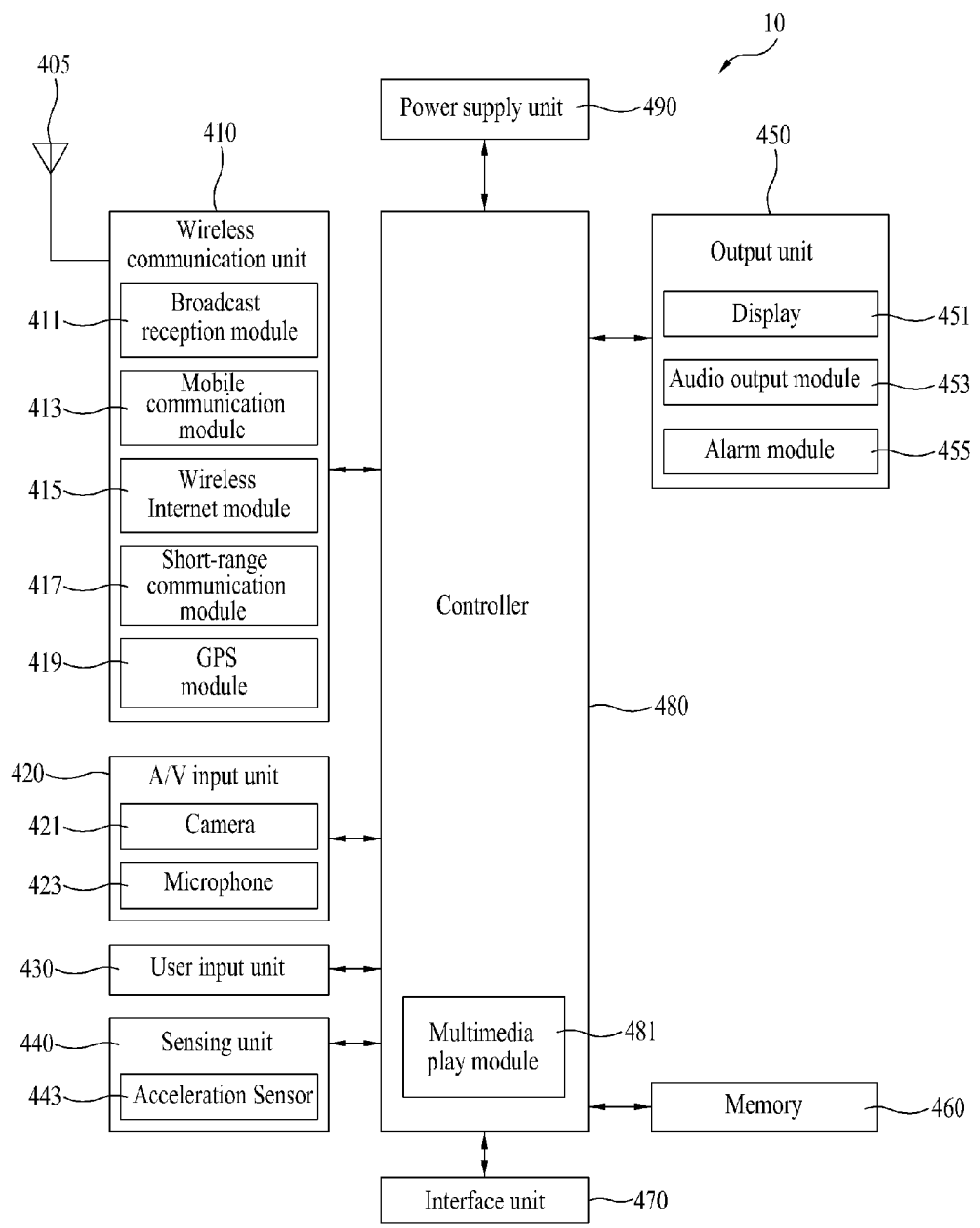
FIG. 14 is a block diagram showing in more detail various components which may be implemented in a mobile terminal according to various embodiments of the present invention.

FIG. 14 is a block diagram showing in more detail various components which may be implemented in a mobile terminal (e.g., UE 10 of FIG. 1) according to various embodiments of the present invention. It is understood that greater or fewer components than those shown may be implemented.

Referring to FIG. 14, the mobile terminal, denoted as UE 10, may include a wireless communication unit 410, an audio/video (A/V) input unit 420, a user input unit 430, a sensing unit 440, an output unit 450, a memory 460, an interface unit 470, a controller 480, and a power supply unit 490. Two or more of the wireless communication unit 410, the A/V input unit 420, the user input unit 430, the sensing unit 440, the output unit 450, the memory 460, the interface unit 470, the controller 480, and the power supply unit 490 may be incorporated into a single unit, or some of the wireless communication unit 410, the A/V input unit 420, the user input unit 430, the sensing unit 440, the output unit 450, the memory 460, the interface unit 470, the controller 480, and the power supply unit 490 may be divided into two or more smaller units.

The wireless communication unit 410 may include a broadcast reception module 411, a mobile communication module 413, a wireless Internet module 415, a short-range communication module 417, and a global positioning system (GPS) module 419.

The broadcast reception module 411 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal through a mobile communication network. In this case, the broadcast-related information may be received by the mobile communication module 413, rather than by the broadcast reception module 411. The broadcast-related information may come in various forms, for example, electronic program guide (EPG) of digital multimedia broadcasting (DMB) or electronic service guide (ESG) of digital video broadcast-handheld (DVB-H).

Broadcast reception module 411 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 411 may be configured to be suitable for nearly all types of broadcasting systems other than those set forth herein.

The broadcast signal and/or the broadcast-related information received by the broadcast reception module 411 may be stored in memory 460. The mobile communication module 413 transmits wireless signals to or receives wireless signals from at least one or more of a base station, an external station, and a server through a mobile communication network. The wireless signals may include various types of data according to whether the mobile terminal transmits/receives voice call signals, video call signals, or text/multimedia messages.

The wireless Internet module 415 may be a module for wirelessly accessing the Internet. The wireless Internet module 415 may be embedded in the mobile terminal or may be installed in an external device.

The short-range communication module 417 may be a module for short-range communication. The short-range communication module 417 may use various short-range communication techniques such as Bluetooth®, radio frequency identification (RFID), infrared data association (IrDA), ultra wideband (UWB), and ZigBee®.

The GPS module 419 may receive position information from one or more satellites (e.g., GPS satellites).

The A/V input unit 420 may be used to receive audio signals or video signals. The A/V input unit 420 may include one or more cameras 421 and a microphone 423. The camera 421 processes various image frames such as still images or moving images captured by an image sensor during a video call mode or an image capturing mode. The image frames processed by the camera 421 may be displayed by a display module 451.

The image frames processed by the camera 421 may be stored in the memory 460 or may be transmitted outside the mobile terminal through the wireless communication unit 410. The mobile terminal may include more than two cameras.

The microphone 423 receives external sound signals during a call mode, a recording mode, or a voice recognition mode with the use of a microphone and converts the sound signals into electrical sound data. In the call mode, the mobile communication module 413 may convert the electrical sound data into data that can be readily transmitted to a mobile communication base station and then output the data obtained by the conversion. The microphone 423 may use various noise removal algorithms to remove noise that may be generated during the reception of external sound signals.

The user input unit 430 generates key input data based on user input for controlling the operation of the mobile terminal. The user input unit 430 may be implemented as a keypad, a dome switch, a touch pad (either static pressure or constant electricity), a jog wheel, or a jog switch. In particular, if the user input unit 430 is implemented as a touch pad and forms a mutual layer structure along with the display module 451, the user input unit 430 and the display module 451 may be collectively referred to as a touch screen.

The sensing unit 440 determines a current state of the mobile terminal such as whether the mobile terminal is opened or closed, the position of the mobile terminal and whether the mobile terminal is placed in contact with a user. In addition, the sensing unit 440 generates a sensing signal for controlling the operation of the mobile terminal.

For example, when the mobile terminal is a slider-type mobile phone, the sensing unit 440 may determine whether the mobile terminal is opened or closed. In addition, the sensing unit 440 may determine whether the mobile terminal is powered by the power supply unit 490 and whether the interface unit 470 is connected to an external device.

The sensing unit 440 may include an acceleration sensor 443. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 443 representing different axial directions may be installed in the mobile terminal. Alternatively, only one acceleration sensor 443 representing a Z axis may be installed in the mobile terminal.

The output unit 450 may output audio signals, video signals, and alarm signals. The output unit 450 may include the display module 451, an audio output module 453, and an alarm module 455.

The display module 451 may display various information processed by the mobile terminal. For example, if the mobile terminal is in a call mode, the display module 451 may display a user interface (UI) or a graphical user interface (GUI) for making or receiving a call. If the mobile terminal is in a video call mode or an image capturing mode, the display module 451 may display a UI or a GUI for capturing or receiving images.

If the display module 451 and the user input unit 430 form a mutual layer structure and are thus implemented as a touch screen, the display module 451 may be used not only as an output device but also as an input device. If the display module 451 is implemented as a touch screen, the display module 451 may also include a touch screen panel and a touch screen panel controller.

The touch screen panel is a transparent panel attached onto the exterior of the mobile terminal and may be connected to an internal bus of the mobile terminal. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 480. The control unit 480 then determines whether a touch input has been generated and which part of the touch screen panel has been touched based on the processed signals transmitted by the touch screen panel controller.

As described above, if the display module 451 and the user input unit 430 form a mutual layer structure and are thus implemented as a touch screen, the display module 451 may be used not only as an output device but also as an input device. The display module 451 may include at least one of a liquid crystal display (LCD), a thin film transistor (TFT)-LCD, an organic light-emitting diode (OLED), a flexible display, and a three-dimensional (3D) display.

The mobile terminal may include two or more display modules 451. For example, the mobile terminal may include an external display module and an internal display module.

The audio output module 453 may output audio data received by the wireless communication unit 410 during a call reception mode, a call mode, a recording mode, a voice recognition mode, or a broadcast reception mode or may output audio data present in the memory 460. In addition, the audio output module 453 may output various sound signals associated with the functions of the mobile terminal such as receiving a call or a message. The audio output module 453 may include a speaker and a buzzer.

The alarm module 455 may output an alarm signal indicating the occurrence of an event in the mobile terminal Examples of the event include receiving a call signal, receiving a message, and receiving a key signal. Examples of the alarm signal output by the alarm module 455 include an audio signal, a video signal, and a vibration signal.

The alarm module 455 may output a vibration signal upon receiving a call signal or a message. In addition, the alarm module 455 may receive a key signal and may output a vibration signal as feedback to the key signal.

Once a vibration signal is output by the alarm module 455, the user may recognize that an event has occurred. A signal for notifying the user of the occurrence of an event may be output by the display module 451 or the audio output module 453.

The memory 460 may store various programs necessary for the operation of the controller 480. In addition, the memory 460 may temporarily store various data such as a phonebook, messages, still images, or moving images.

The memory 460 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal may operate a web storage, which performs the functions of the memory 460 on the Internet.

The interface unit 470 may interface with an external device that can be connected to the mobile terminal. The interface unit 470 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 470 may receive data from an external device or may be powered by an external device. The interface unit 470 may transmit data provided by an external device to other components in the mobile terminal or may transmit data provided by other components in the mobile terminal to an external device.

The controller 480 may control the general operation of the mobile terminal. For example, the controller 480 may perform various control operations regarding making/receiving a voice call, transmitting/receiving data, or making/receiving a video call.

The controller 480 may include a multimedia play module 481, which plays multimedia data. The multimedia play module 481 may be implemented as a hardware device and may be installed in the controller 480. Alternatively, the multimedia play module 481 may be implemented as a software program.

The power supply unit 490 is supplied with power by an external power source or an internal power source and supplies power to other components in the mobile terminal.

In alternative implementations, certain logic operations may be performed in a different order, modified or removed and still implement exemplary embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which exemplary embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for generating a broadcast signal, the method comprising:
    forming an information block for transmission, the information block comprising a first field comprising a plurality of bits having a predetermined value;
    generating error detection bits based upon the information block;
    scrambling the plurality of bits of the first field and the error detection bits using a mask, wherein the mask comprises a first mask pattern to scramble the plurality of bits of the first field and a second mask pattern to scramble the error detection bits;
    generating the broadcast signal comprising the information block including the scrambled plurality of bits, and the scrambled error detection bits; and
    transmitting the generated broadcast signal via a packet broadcast control channel,
    wherein the first mask pattern imparts information to a first group of user equipment (UEs) regarding a first evolved NodeB (eNodeB) transmit antenna configuration and the second mask pattern imparts information to a second group of UEs regarding a second eNodeB transmit antenna configuration.

2. The method of claim 1, wherein the first eNodeB transmit antenna configuration is different from the second eNodeB transmit antenna configuration.

3. The method of claim 1, wherein the first eNodeB transmit antenna configuration is the same as the second eNodeB transmit antenna configuration.

4. The method of claim 1,
wherein the second eNodeB transmit antenna configuration is one of a total of three configurations,
wherein the second mask pattern corresponds to the one of the total of three configurations,
wherein the first evolved NodeB (eNodeB) transmit antenna configuration is one of a total of four configurations, and
wherein the first mask pattern defines a value corresponding to the one of the total of four configurations.

5. The method of claim 1, wherein the error detection bits define a 16-bit cyclic redundancy check (CRC) and the mask is a CRC mask.

6. The method of claim 1, wherein the first mask pattern comprises 2 bits for identifying 4 separate antenna configurations of the first eNodeB transmit antenna configuration.

7. The method of claim 1, wherein the information block further comprises a second field configured to impart, to both the first group of UEs and the second group of UEs, information regarding a transmission bandwidth configuration and a third field configured to impart, to both the first group of UEs and the second group of UEs, information regarding a system frame number.

8. A wireless broadcast system, comprising:
a transmitter configured to transmit a generated broadcast signal via a packet broadcast control channel;
a processor configured to:
form an information block for transmission, the information block comprising a first field comprising a plurality of bits having a predetermined value;
generate error detection bits based upon the information block;
scramble the plurality of bits of the first field and the error detection bits using a mask, wherein the mask comprises a first mask pattern to scramble the plurality of bits of the first field and a second mask pattern to scramble the error detection bits;
generate the broadcast signal comprising the information block including the scrambled plurality of bits and the scrambled error detection bits; and
cause the transmitter to transmit the generated broadcast signal via the packet broadcast channel,
wherein the first mask pattern imparts information to a first group of user equipment (UEs) regarding a first evolved NodeB (eNodeB) transmit antenna configuration and the second mask pattern imparts information to a second group of UEs regarding a second eNodeB transmit antenna configuration.

9. The wireless broadcast system of claim 8, wherein the first eNodeB transmit antenna configuration is different from the second eNodeB transmit antenna configuration.

10. The wireless broadcast system of claim 8, wherein the first eNodeB transmit antenna configuration is the same as the second eNodeB transmit antenna configuration.

11. The wireless broadcast system of claim 8,
wherein the second eNodeB transmit antenna configuration is one of a total of three configurations,
wherein the first mask pattern corresponds to the one of the total of three configurations,
wherein the first evolved NodeB (eNodeB) transmit antenna configuration is one of a total of four configurations, and
wherein the second mask pattern defines a value corresponding to the one of the total of four configurations.

12. The wireless broadcast system of claim 8, wherein the error detection bits define a 16-bit cyclic redundancy check (CRC) and the mask is a CRC mask.

13. The wireless broadcast system of claim 8, wherein the first mask pattern comprises 2 bits for identifying 4 separate antenna configurations of the first eNodeB transmit antenna configuration.

14. The wireless broadcast system of claim 8, wherein the information block further comprises a second field configured to impart, to both the first group of UEs and the second group of UEs, information regarding a transmission bandwidth configuration and a third field configured to impart, to both the first group of UEs and the second group of UEs, information regarding a system frame number.

* * * * *